United States Patent [19]
Geimer

[11] Patent Number: 5,042,527
[45] Date of Patent: Aug. 27, 1991

[54] VALVE FOR FLUID DISPENSING SYSTEM

[75] Inventor: Raymond C. Geimer, Mehlville, Mo.

[73] Assignee: Monsanto Company, St. Louis, Mo.

[21] Appl. No.: 441,678

[22] Filed: Nov. 27, 1989

[51] Int. Cl.⁵ ............................................. F16K 41/12
[52] U.S. Cl. .................. 137/560; 251/335.2; 251/245; 251/246
[58] Field of Search ............... 251/335.2, 900, 244, 251/245, 246; 137/560

[56] References Cited

U.S. PATENT DOCUMENTS

| | | | |
|---|---|---|---|
| 2,035,202 | 3/1936 | Smith | 251/335.2 X |
| 2,136,940 | 11/1938 | Ehbrecht | 251/335.2 X |
| 2,338,387 | 1/1944 | Whitman | 137/560 X |
| 2,412,479 | 12/1946 | Smith | 251/335.2 X |
| 2,506,837 | 5/1950 | Kochner | 251/335.2 X |
| 3,415,454 | 12/1968 | Bucknell et al. | 239/562 |
| 3,734,125 | 5/1973 | Bruce et al. | 137/495 |
| 4,260,130 | 4/1981 | Brehm | 251/113 |
| 4,316,600 | 2/1982 | Parise et al. | 251/245 |
| 4,376,447 | 3/1983 | Chumley | 137/244 |
| 4,694,975 | 9/1987 | Hagan | 251/335.2 X |
| 4,872,643 | 10/1989 | Lo | 251/900 X |

*Primary Examiner*—John Rivell
*Attorney, Agent, or Firm*—Senniger, Powers, Leavitt & Roedel

[57] ABSTRACT

A valve for use in a fluid dispensing system, the valve includes a valve body having a valve passage therein, having first and second ends, the second end including a valve seat. The valve also includes a valve stem having an end portion extending into the valve passage constructed to permit the flow of fluid through the passage past the end portion. The valve stem has sealing means for closing the second end of the passage, and is mounted for reciprocal movement in the valve passage between an extended position in which the sealing means on the valve stem engages the valve seat and closes the second end of the valve passage, and a retracted position in which the sealing means is spaced from the valve seat so that fluid can flow through the valve passage past the end portion of the valve stem. A spring resiliently biases the valve stem toward its extended position. The spring is protected from the fluid flow through the valve by a flexible annular sealing disk.

14 Claims, 3 Drawing Sheets

VALVE FOR FLUID DISPENSING SYSTEM

BACKGROUND OF THE INVENTION

This invention relates to valves, and in particular to valves for fluid dispensing systems.

One type of valve typically used in fluid dispensing systems, for example systems used to distribute fertilizers, pesticides, and herbicides, comprises a valve spool with a number of o-rings on it, which reciprocates in a valve housing. However, the friction caused by the rubbing of the o-rings against the valve housing not only causes wear, but also requires a relatively large force to bias the valve closed. This means that a relatively large force is required to operate the valve, which is fatiguing to the user.

It is also desirable that valves used in fluid dispensing systems be of very simple construction so that the fluids passing through the valves do not foul the valves or interfere with their operation. This is important because fluid dispensing systems are often subject to in-service abuse and may not be well maintained. For example, the system may not be properly cleaned after each use, allowing residual amounts of fluids to dry in the valve. This means that it is desirable that as few parts of the valve as possible come in contact with the fluid. Moreover, it means that the valve should be constructed so that it is relatively easy to clean, and so that it can withstand substantial back pressures that may be used to clean the valve.

SUMMARY OF THE INVENTION

It is among the objects of the present invention to provide a valve for use in a fluid dispensing system that is of simple and reliable construction; and to provide such a valve that is constructed so that a minimum number of parts come in contact with the fluid flowing through the valve. It is also among the objects of the present invention to provide such a valve that is relatively rugged, so that it does not easily become fouled and it resists getting stuck. It is also among the objects of the present invention to provide such a valve that can withstand relatively high back pressures which may be used to clean the valve. It is also among the objects of this invention to provide a valve which reliably closes, but which requires a relatively low force to operate.

Generally, the valve of the present invention comprises a valve body having a valve passage therein. The valve passage has first and second ends, and a valve seat at the second end. The valve further comprises a valve stem that has an end portion extending into the valve passage. This end portion is shaped to permit the flow of fluid through the valve passage past the end portion. The valve stem also has sealing means to close the second end of the valve passage.

The valve also includes means for mounting the valve stem for reciprocal movement in the valve passage. The valve stem can reciprocate between an extended position in which the sealing means on the valve stem engages the valve seat and closes the second end of the valve passage, and a retracted position in which the sealing means is spaced from the valve seat so that fluid can flow through the valve passage past the end portion of the valve stem. The valve also includes means for resiliently biasing the valve stem toward its extended position.

The end portion of the valve stem extending into the valve passage may have a plurality of recesses therein, and preferably this end portion has a generally cruciform cross-section. The recesses allow fluid to flow through the valve passage, past the end portion. The sealing means on the valve stem preferably comprises a shoulder projecting generally radially outwardly from the stem. The shoulder (and the cross section of the stem) are adapted to block the second end of the valve passage. The sealing means may further comprise an o-ring on the end portion of the stem, abutting the shoulder, for sealing engagement with valve seat.

The means for biasing the valve stem preferably comprises a coil spring mounted on the valve stem. Sealing means may be provided for sealing the spring means against fluid flow through the valve. This sealing means may comprise an annular flexible disk having a central opening for receiving the valve stem, means for sealingly securing the inner edge of the disk to the valve stem, and means for sealingly securing the outer edge of the disk to the valve body.

The valve of this invention is of simple and reliable construction. The valve includes a flexible sealing means for the biasing spring that protects the spring and other valve parts from contact with the fluid flowing through the valve. Thus, only a minimum number of parts come in contact with the fluid flowing through the valve. The flexible sealing means is secured and supported to be able to withstand the relatively high back pressures which may be used to clean the valve. The valve is relatively rugged, so that it does not easily become fouled. The o-ring, which facilitates sealing of the valve, can move relative to the stem so that if the o-ring should become stuck on the valve seat the valve can still open and fluid pass past the end portion of the stem. With the unique construction of the valve which eliminates the frictional contact common in many of the valves used in this type of fluid dispensing system, and the protection of the biasing spring from fouling, the biasing spring can exert a relatively low force and the valve will still reliably close. The use of a relatively low force spring also reduces user fatigue.

These and other advantages will be in part apparent, and in part pointed out hereinafter.

BRIEF DESCRIPTION OF THE DRAWINGS

Corresponding reference numerals indicate corresponding parts throughout the several view of the drawings.

DETAILED DESCRIPTION OF THE PREFERRED EMBODIMENT

Figure 1:
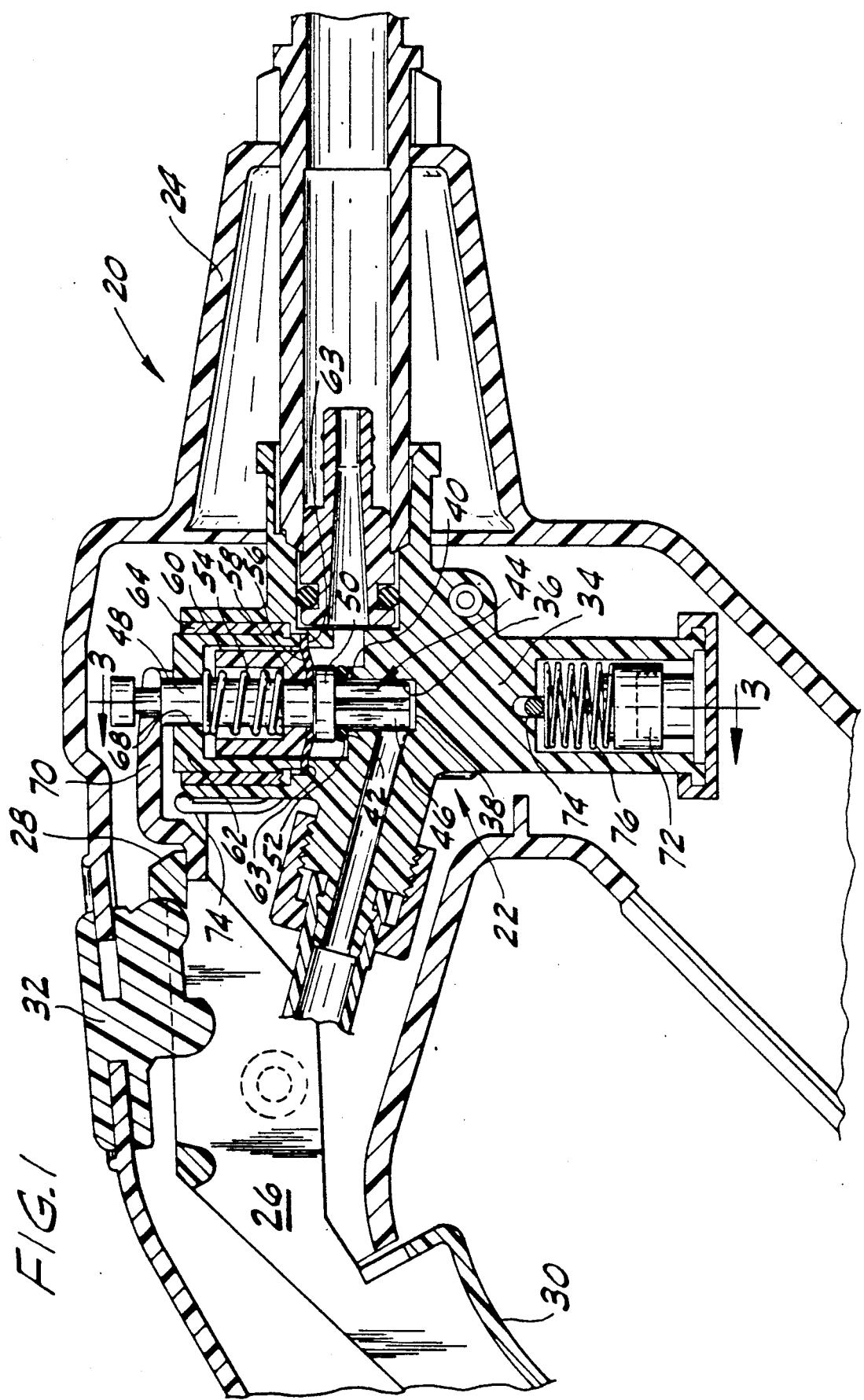
FIG. 1 is a longitudinal cross-sectional view of a fluid dispensing device incorporating a valve constructed according to the principles of this invention, with the valve shown in its closed position.
Figure 2:
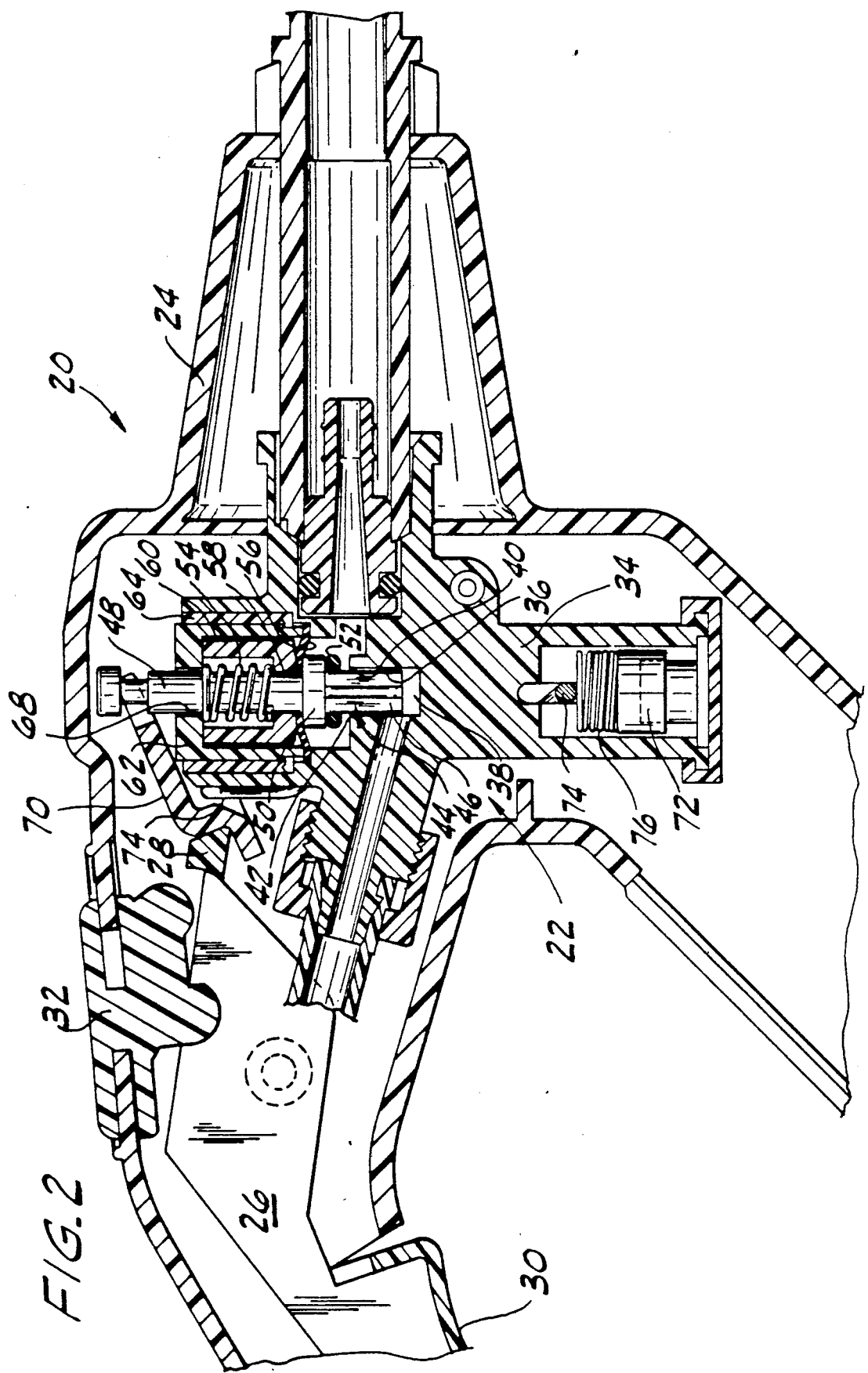
FIG. 2 is a longitudinal cross-sectional view of the fluid dispensing device with the valve shown in its open position.

A fluid dispensing device 20 incorporating a valve 22 constructed according to the principles of the present invention is shown in longitudinal cross-section in FIGS. 1 and 2. The fluid dispensing device 20 comprises a molded plastic body 24. A trigger member 26 is pivotally mounted in the body 24. The trigger member 26 includes an actuator bar 28 for operating the valve 22 as described more completely below, and a finger grip 30 which can be squeezed by a user to pivot the trigger member 26 so that the actuator bar 28 operates the valve 22. The device 20 may also include a sliding lock member 32, which can be moved to lock the trigger member 26 in its pivoted position to hold the valve 22 open. The details of the construction of the fluid dispensing device 20 are not critical to the valve of this invention.

The valve 22 of this invention comprises a valve body 34, which can be made of a strong but lightweight, chemically inert polymer such as Delrin TM polyacetyl filled homopolymer, or some other suitable material. The valve body 34 has a valve passage 36 extending therethrough. The valve passage 36 has a first end 38 and a second end 40. In this preferred embodiment the first end 38 serves as the inlet end of the valve passage 36, and the second end 40 serves as the outlet end of the valve passage 36, but it should be understood that the flow through the valve passage could be reversed, if desired. A valve seat 42 is located at the second end 40 of the passage 36. The valve seat 42 is generally annular, and surrounds the second end 40.

The valve 22 further comprises a valve stem generally designated 44, having first and second end portions 46 and 48, respectively. The valve stem 44 is preferably made from a strong, light weight, chemical-resistant polymer material, such as Delrin TM polyacetyl filled homopolymer, or some other suitable material. The first end portion 46 of the valve stem extends endwise into the valve passage 36 down past the valve seat 42, and is constructed to permit the flow of fluid through the valve passage 36 past the first end portion 46. The first end 38 of the valve passage 36 can serve as a stop for the valve stem 44, preventing overtravel of the valve stem. The first end portion 46 of the valve stem is configured to permit the passage of fluid, and preferably has a cruciform or x-shaped cross-section.

The valve stem 44 also includes sealing means between the first and second end portions, adapted to close the second end 40 of the valve passage 36. The sealing means preferably comprises an annular shoulder 50 projecting generally radially outwardly from the valve stem 44. The shoulder 50 (and the solid cross section of the stem 44 at the shoulder), can close the second end 40 of the valve passage 36. The sealing means may also comprise an o-ring 52 on the first end portion 46 of the stem 44, abutting the shoulder 50. The o-ring 52 is adapted to be compressed by the shoulder 50 against the valve seat 42 to form a tight, leak-resistant seal. The o-ring 52 has a relatively close slip-fit on the first end portion 46 of the stem 44, in abutment with the shoulder 50. This slip-fit permits relative axial movement of the valve system relative to the o-ring in the event the o-ring becomes stuck on the valve seat 42, for example.

The valve stem 44 is mounted for reciprocal movement in the valve passage 36 between an extended position (FIG. 1) in which the o-ring 52 on the valve stem 44 engages the valve seat 42 and closes the second end 40 of the valve passage 36, and a retracted position (FIG. 2) in which the o-ring 52 is spaced from the valve seat 42 so that fluid can flow through the valve passage past the first end portion 46 of the valve stem (as permitted by the configuration of the end portion).

The valve 22 also comprises means for resiliently biasing the valve stem to its extended position. The biasing means may be a spring 54 having opposite ends. The spring 54 is preferably made of stainless steel. One end of the spring 54 is fixed relative to the valve body 34, and the other end of the spring 54 is fixed relative to the valve stem 44. The spring 54 is preferably a coil spring mounted on the second end portion 48 of the valve stem 44. There is preferably some means for sealing the spring 54, to protect it and the rest of the valve mechanism from the fluid flow through the valve. This sealing means may comprise an annular flexible diaphragm or disk 56 having a central opening 58 for receiving the valve stem 44. The disk 56 is relatively thin and flexible to accommodate movement of the valve stem 44. The inner edge margin of the disk 56 (which defines the opening 58) is sealingly secured to the valve stem 44. The outer edge margin of the disk 56 is sealingly secured to the valve body 34. The annular central portion 56a of the disk 56 between its inner and outer edge margins is exposed to fluid pressure when the valve stem is in its retracted position to permit flow through the valve passage 36 (see FIG. 3). The disk 56 is preferably made from a very flexible, chemical-resistant polymer material, such as a fluoroelastomer polymer with Teflon TM base fiber.

Figure 3:
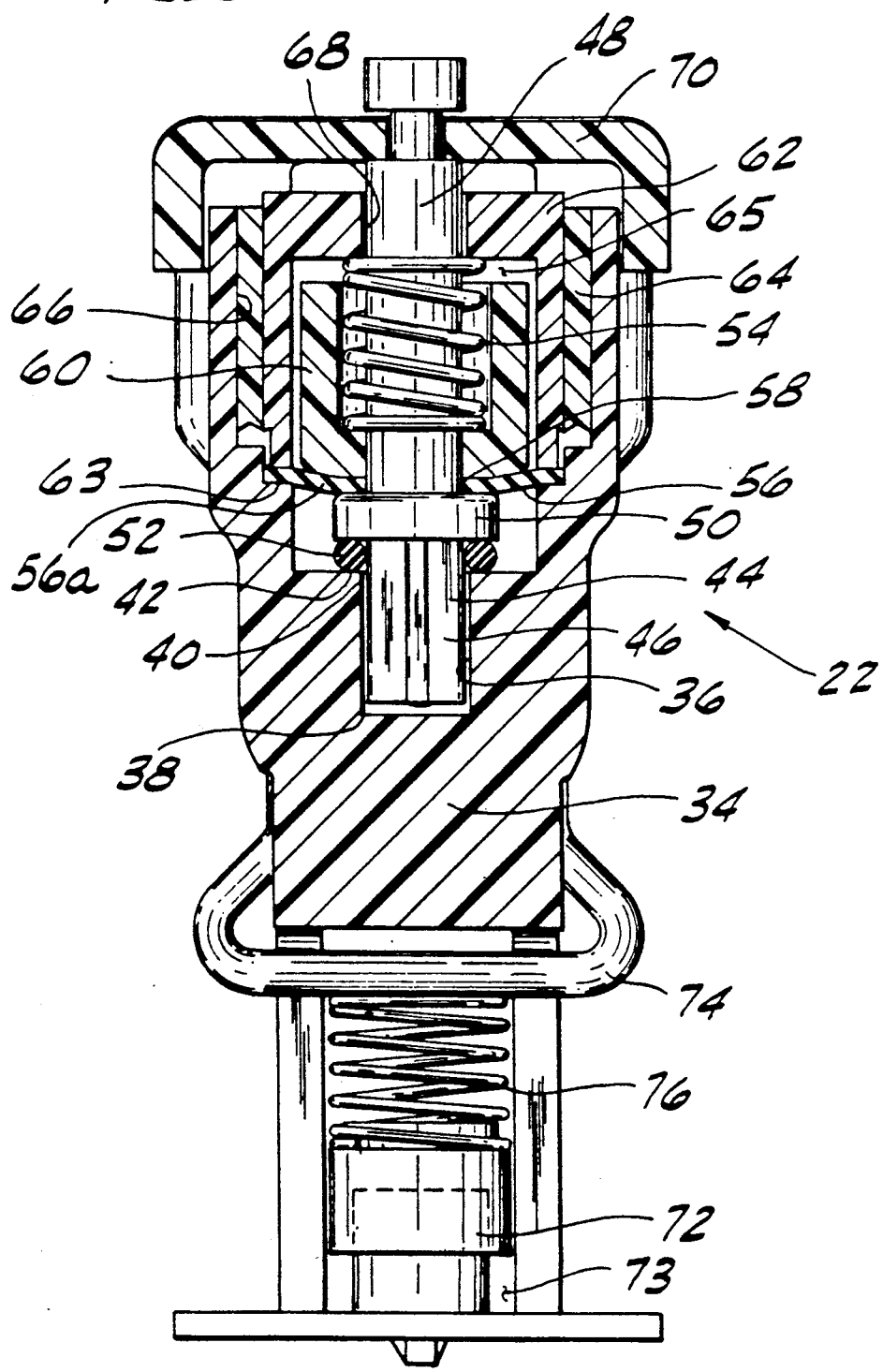
FIG. 3 is a transverse cross-sectional view of the valve taken along the plane of line 3—3 in FIG. 1.

The means for securing the inner edge margin of the disk 56 to the valve stem 44 may be a cup-shaped retainer 60 having a sliding non-threaded fit on the second end portion 48 of the valve stem 44, adapted to sandwich the inner edge margin of the disk 56 against the shoulder 50 of the valve stem 44. As illustrated in FIG. 3, the retainer 60 has a bottom end wall and upstanding side wall. The end wall has an opening in it for receiving the valve stem. The retainer 60 is preferably made from a strong, lightweight polymer material, such as Delrin TM polyacetyl filled homopolymer, or some other suitable material. The retainer 60 also serves to fix one end of the spring 54 (the lower end as viewed in FIG. 3) relative to the valve stem 44. The spring 54 urges the retainer 60 toward the shoulder 50 of the valve stem 44 to sandwich the disk 56 against the shoulder of the valve stem. The bottom surface of the retainer 60 engages most of the exposed annular central portion of the flexible disk 56, thereby supporting this area of the disk even during high back pressures which may be applied to clean the valve 22.

The means for securing the outer edge of the flexible disk 56 to the valve body 34 may be a cap 62, and means for mounting the cap 62 on the valve body 34, so that the cap 62 sandwiches the outer edge of the disk against an internal shoulder 63 formed on the valve body. The cap 62 may have a threaded fit 64 in an opening 66 in the valve body 34 above the valve passage 36. The inside surface of the cap, in conjunction with the disk 56, defines a chamber 65 in the valve body 34 for the retainer 60, spring 54 and second end portion 48 of the valve stem 44. The retainer 60 has a relatively close clearance fit with the inside wall of the chamber 65. The cap 62 also serves to fix one end of the spring 54 (its upper end as viewed in FIG. 3) relative to the valve body 34. The cap 62 is preferably made from a strong, light weight polymer material, such as Delrin TM polyacetyl filled homopolymer, or some other suitable material. The cap 62 has an opening 68 therein through which a part of the second end portion 48 of the valve stem 44 projects so that the cap 62 also serves to mount the valve stem 44 for reciprocal movement. Operating means, such as a lever 70, engages the part of the stem 44 projecting through the cap 62 for moving the valve stem 44 against the bias of the spring 54. The lever 70 is engageable by the actuator bar 28 on the trigger member 26 so that when the trigger 30 is depressed to pivot the trigger member 26, actuator bar 28 pivots lever 70 to move stem 44 to its retracted position, thereby opening valve 22.

The valve 22 may also comprise an electric switch 72 that controls some part of the dispensing apparatus, for example a spinner (not shown) at the discharge end of the device 20. In this case, it may be desirable to have the switch 72 actuated simultaneously when the valve 22 is opened. Thus a link 74 may be provided between the lever 70 and the switch 72 which is located in a cavity 73 in the valve body 34, so that hen the lever 70 is operated, switch 72 is actuated. A spring 76 may be provided between the link 74 and the switch 72 to accommodate any excess travel of the link 74 relative to the switch 72.

OPERATION

The valve 22 operates easily and reliably. To deliver fluid from the fluid delivery device 20, the trigger 30 is depressed, which pivots trigger member 26 causing the actuator bar 28 to move lever 70, thereby moving valve stem 44 to its retracted position. The retainer 60 is engageable with the cap 62 to limit the travel of the valve stem as it moves to its retracted position. As the valve stem moves toward its retracted position, the o-ring 52 and shoulder 50 move away from the valve seat 42 and fluid is permitted to flow through the valve passage 36 past the first end portion 46 of the valve stem 44. As the valve is opened, the link 74 simultaneously actuates the switch 72.

Even if the o-ring 52 becomes stuck to the valve seat 42, the stem 44 can still be moved and fluid can still flow through the recesses in the first end portion 46 of the valve stem 44. The spring 54 that biases the valve stem 44, and the other elements of the valve 22, are protected from the fluid by the flexible disk 56. The flexible disk 56 is supported by the retainer 60, and thus can resist high back pressures that might be used to clean the valve 22. Because the valve 22 does not rely on the frictional engagement between a valve spool and valve passage for sealing, the coil spring 54 does not have to be as strong, and thus it is easier for the operator to open the valve.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A valve for use in a fluid dispensing system, the valve comprising:

a valve body having a valve passage therein, a valve seat in the valve passage, a chamber in the valve body generally adjacent said valve passage, a valve stem in the valve chamber having an end portion extending endwise past said valve seat and into said valve passage, said end portion being constructed to permit flow of fluid through the valve passage past said end portion of the valve stem, sealing means on the valve stem engageable with the valve seat for blocking flow through the valve passage, means mounting the valve stem for reciprocal movement between an extended position in which the sealing means on the valve stem engages the valve seat for blocking flow through the valve passage, and a retracted position in which the sealing means is spaced from the valve seat to permit fluid flow therepast and past said end portion of the valve stem extending into said valve passage, a spring in the chamber for resiliently biasing the valve stem toward its extended position, an annular diaphragm for sealing the chamber and said spring from fluid flowing through the valve passage, said diaphragm having a central opening therein through which the valve stem extends endwise into the valve passage, means for sealingly securing an inner edge margin of the diaphragm to the valve stem, means for sealingly securing an outer edge margin of the diaphragm to the valve body, said means for sealingly securing said inner edge margin of the diaphragm to the valve stem comprising retainer means in said chamber having a sliding non-threaded fit on the valve stem, and a shoulder on the valve stem, said diaphragm being disposed between said retainer means and said shoulder, said spring being engageable with said retainer means for forcing the retainer means against the diaphragm to seal the inner margin of the diaphragm against the shoulder on the valve stem, said diaphragm being relatively thin and flexible for flexing as the valve stem is moved between its said extended and retracted positions, and operating means engageable with the valve stem for moving the valve stem to its said retracted position against the bias of said spring.

2. A valve as set forth in claim 1 further comprising means affixed to the valve body and engageable by said retainer means to limit the travel of the valve stem as it moves to its retracted position.

3. A valve as set forth in claim 1 wherein said diaphragm has a central annular portion between its said inner and outer edge margins exposed to fluid pressure when the valve stem is in its retracted position, and wherein said retainer means is formed for engagement not only with said inner edge margin of the diaphragm but also with most of the central portion of the diaphragm for supporting said central portion against said fluid pressure.

4. A valve as set forth in claim 3 wherein said retainer means comprises a retainer slidably mounted on the valve stem, and wherein said spring comprises a coil spring surrounding said valve stem and engaging the retainer to force the retainer against the diaphragm.

5. A valve as set forth in claim 4 wherein said retainer has a relatively close clearance fit with an inside wall of said chamber.

6. A valve as set forth in claim 5 wherein said retainer is cup-shaped with an end wall and a side wall, said end wall having an opening for receiving said valve stem therethrough, said spring being disposed inside the retainer and being engageable with said end wall of the retainer.

7. A valve as set forth in claim 4 wherein said means for securing the outer edge margin of the diaphragm to the valve body comprises a cap threadable in the valve body and into engagement with the outer edge margin of the diaphragm to sealingly force the outer edge margin against a shoulder on the valve body.

8. A valve as set forth in claim 7 wherein said spring is engageable with the cap for fixing the spring relative to the valve body, said cap having an opening therein through which a part of the valve stem projects, said operating means being engageable with said part of the stem projecting through the cap for moving the valve stem against the bias of the spring to its said retracted position.

9. A valve as set forth in claim 7 wherein said retainer is engageable with said cap to limit the travel of the valve stem as it move to its retracted position.

10. A valve as set forth in claim 1 further comprising a cavity in said valve body, a switch in the cavity, and link means interconnecting said operating means and said switch whereby actuation of said operating means is adapted simultaneously to actuate the switch.

11. A valve for use in a fluid dispensing system, the valve comprising
a valve body having a valve passage therein,
a valve seat in the valve passage,
a chamber in the valve body generally adjacent said valve passage,
a valve stem in the valve chamber having an end portion extending endwise into said valve passage,
sealing means on the valve stem engageable with the valve seat for blocking flow through the valve passage,
means mounting the valve stem for reciprocal movement between an extended position in which the sealing means on the valve stem engages the valve seat for blocking flow through the valve passage, and a retracted position in which the sealing means is spaced from the valve seat to permit fluid flow therepast and past said end portion of the valve stem,
a spring in the chamber for resiliently biasing the valve stem toward its extended position,
an annular diaphragm for sealing the chamber and said spring from fluid flowing through the valve passage, said diaphragm having a central opening therein through which the valve stem extends endwise into the valve passage,
means for sealingly securing an inner edge margin of the diaphragm to the valve stem,
means for sealingly securing an outer edge margin of the diaphragm to the valve body,
said means for sealingly securing said inner edge margin of the diaphragm to the valve stem comprising retainer means in said chamber removably mounted on the valve stem for movement with the valve stem, and a shoulder on the valve stem, said diaphragm being disposed between said retainer means and said shoulder with the retainer sealingly forcing the inner edge margin of the diaphragm against the shoulder on the valve stem,
said diaphragm being relatively thin and flexible for flexing as the valve stem is moved between its said extended and retracted positions, said diaphragm having a central annular portion between its said inner and outer edge margins exposed to fluid pressure when the valve stem is in its retracted position, said retainer means being formed for engagement not only with said inner edge margin of the diaphragm but also with most of the central portion of the diaphragm for supporting said central portion against said fluid pressure, and means affixed to the valve body and engageable by said retainer means to limit the travel of the valve stem as it moves to its retracted position.

12. A valve as set forth in claim 11 further comprising operating means engageable with the valve stem for moving the valve stem to its said retracted position against the bias of said spring, said operating means comprising manually operable trigger means adapted to be manually operated to overcome the bias of said spring to move the valve stem to its said retracted position and thereby permit flow through the valve passage, said valve body having a cavity therein, a switch in the cavity, and link means interconnecting said operating means and said switch whereby actuation of said trigger means to retract the valve stem is adapted simultaneously to acutate the switch.

13. A valve for use in a fluid dispensing system, the valve comprising:
a valve body having a valve passage therein, the valve passage having first and second ends, and a valve seat at the second end;
an o-ring;
a valve stem having first and second end portions, the first end portion extending into the valve passage and having a generally cruciform cross-section to permit the flow of fluid through the passage, past the first end portion, the valve stem further comprising a shoulder projecting generally radially outwardly from the stem between the end portions of the stem, for closing the second end of the valve passage and urging the o-ring against the valve seat to sealingly engage the valve seat;
a cap on the valve body, the cap having an opening therein for receiving the second end portion of the valve stem to mount the valve stem for reciprocal movement in the valve passage between an extended position in which the o-ring engages the valve seat and the shoulder closes the second end of the valve passage and a retracted position in which the o-ring is spaced from the valve seat so that fluid can flow through the valve passage, past the first end portion of the valve stem;
a spring mounted on the second end portion of the valve stem, one end of the spring engaging the cap and the other end of the spring being fixed relative to the valve stem to resiliently bias the valve stem toward its extended position;
sealing means for sealing the spring from the flow of fluid through the open valve, said sealing means comprising an annular flexible diaphragm having a central opening therein for receiving the valve stem,
a retainer on the second end portion of the valve stem engaged by the spring to force the retainer against the diaphragm to sealingly secure an inner edge margin of the diaphragm against the shoulder on the valve stem, said diaphragm having an outer edge margin sealingly secured to said valve body, and
said cap being engageable by said retainer for limiting the travel of the valve stem away from its extended position.

14. A fluid dispensing device comprising a body having a fluid flow passage therein, and a valve in the flow passage for controlling the flow of fluid therethrough, said valve comprising
a valve body having a valve passage therein communicating with said fluid flow passage in the device, a valve seat in the valve passage, a chamber in the valve body generally adjacent said valve passage, a valve stem in the valve chamber having an end portion extending endwise past said valve seat and into said valve passage, said end portion being constructed to permit flow of fluid through the valve passage past said end portion of the valve stem, sealing means on the valve stem engageable with the valve seat for blocking flow through the valve passage, means mounting the valve stem for reciprocal movement between an extended position in which the sealing means on the valve stem engages the valve seat for blocking flow through the valve passage, and a retracted position in which the sealing means is spaced from the valve seat to permit fluid flow therepast and past said end portion of the valve stem extending into said valve passage, a spring in the chamber for resiliently biasing the valve stem toward its extended position, an annular diaphragm for sealing the chamber and said spring from fluid flowing through the valve passage, said diaphragm having a central opening therein through which the valve stem extends endwise into the valve passage, means for sealingly securing an inner edge margin of the diaphragm to the valve stem, means for sealingly securing an outer edge margin of the diaphragm to the valve body, said means for sealingly securing said inner edge margin of the diaphragm to the valve stem comprising retainer means in said chamber having a sliding non-threaded fit on the valve stem, and a shoulder on the valve stem, said diaphragm being disposed between said retainer means and said shoulder, said spring being engageable with said retainer means for forcing the retainer means against the diaphragm to seal the inner margin of the diaphragm against the shoulder on the valve stem, said diaphragm being relatively thin and flexible for flexing as the valve stem is moved between its said extended and retracted positions, said diaphragm having a central annular portion between its said inner and outer edge margin exposed to fluid pressure when the valve stem is in its retracted position, said retainer means being formed for engagement not only with said inner edge margin of the diaphragm but also with most of the central portion of the diaphragm for supporting said central portion against said fluid pressure, means affixed to the valve body and engageable by said retainer means to limit the travel of the valve stem as it moves toward its retracted position, and operating means engageable with the valve stem for moving the valve stem to its said retracted position against the bias of said spring, said operating means comprising manually operable trigger means on the body of said device, said trigger means being adapted to be manually operated to overcome the bias of said spring to move the valve stem to its said retracted position and thereby permit flow through said fluid flow passage.

* * * * *